United States Patent
Iga

(10) Patent No.: US 7,451,492 B2
(45) Date of Patent: Nov. 11, 2008

(54) PORTABLE INFORMATION TERMINAL, AND ELECTRONIC INFORMATION AUTHENTICATING SYSTEM AND METHOD USING SAME TERMINAL

(75) Inventor: Norihisa Iga, Tokyo (JP)

(73) Assignee: NEC Corporation (JP)

( * ) Notice: Subject to any disclaimer, the term of this patent is extended or adjusted under 35 U.S.C. 154(b) by 771 days.

(21) Appl. No.: 10/944,385

(22) Filed: Sep. 17, 2004

(65) Prior Publication Data
US 2005/0060536 A1 Mar. 17, 2005

(30) Foreign Application Priority Data
Sep. 17, 2003 (JP) .............................. 2003-323835

(51) Int. Cl.
*H04L 9/32* (2006.01)
(52) U.S. Cl. ..................... 726/30; 235/382; 705/65; 713/194
(58) Field of Classification Search ................ 726/30
See application file for complete search history.

(56) References Cited

U.S. PATENT DOCUMENTS

| | | | |
|---|---|---|---|
| 6,729,550 B2 * | 5/2004 | Seita et al. ............... | 235/492 |
| 7,066,385 B2 * | 6/2006 | Fukada et al. ............ | 235/380 |
| 7,287,165 B2 * | 10/2007 | Aono et al. ................ | 713/182 |
| 2002/0042729 A1 * | 4/2002 | Yajima et al. ............. | 705/5 |
| 2003/0154169 A1 * | 8/2003 | Yanai ....................... | 705/65 |
| 2003/0182569 A1 | 9/2003 | Matsuzaki et al. | |

FOREIGN PATENT DOCUMENTS

| WO | WO 03/034409 A2 | 4/2003 |
|---|---|---|
| WO | WO 03/034650 A1 | 4/2003 |

OTHER PUBLICATIONS

Search Report issued by the British Patent Office on Feb. 9, 2005 in connection with corresponding application No. GB 0420713.0.

* cited by examiner

*Primary Examiner*—Matthew B Smithers
(74) *Attorney, Agent, or Firm*—Ostrolenk, Faber, Gerb & Soffen, LLP

(57) ABSTRACT

An electronic information authenticating system is provided which is capable of providing enhanced security of specified electronic information and its related information in the terminal without causing high costs. In a board storing region in a ticket managing board in a portable information terminal, related information passed from a ticket issuing server to which an access is permitted by a board AC (Access Control) unit is stored. A UA (User Agent), ticket board managing server, and ticket issuing server are accessible to the board storing region. An electronic ticket to which consideration on security needs to be given is stored in a secure memory retaining enhanced security, however, the electronic ticket to which consideration on security needs not to be given is put into the board storing region being at low costs.

42 Claims, 9 Drawing Sheets

PORTABLE INFORMATION TERMINAL, AND ELECTRONIC INFORMATION AUTHENTICATING SYSTEM AND METHOD USING SAME TERMINAL

BACKGROUND OF THE INVENTION

1. Field of the Invention

The present invention relates to an electronic information authenticating system, portable information terminal, and an electronic information authenticating method to be used in the electronic information authenticating system and a portable information terminal and more particularly to security of an electronic ticket (admission ticket or a like) stored in the portable information terminal such as a portable cellular phone or a like.

The present application claims priority of Japanese Patent Application No. 2003-323835 filed on Sep. 17, 2003, which is hereby incorporated by reference.

2. Description of the Related Art

In recent years, a portable information terminal such as a portable cellular phone or a like, as it is made multifunctional, is used as a device to input, store, and output, a concert ticket, movie ticket, airline ticket, lodging ticket, resident's card, and admission ticket to an amusement park and/or entertainment facility, in a form of electronic data as so-called an electronic ticket.

When the portable information terminal is used as a device to store the electronic ticket, by presenting the electronic ticket appearing on its display section at a place where information contained in the ticket is required, for example, at an entrance of a concert hall, movie theater, amusement park, recreational facility or a like, permission is granted to enter these places.

However, such the conventional portable information terminal as above has a problem. That is, when the electronic ticket is managed by the conventional portable information terminal, as a ticket storing site which can retain an enhanced level of security, use of a special memory (hereinafter referred to as a "secure memory") having a high level of security such as an IC (Integrated Circuit) card or a like being excellent in tamper-resistance is required, however, the use of such the secure memory causes high costs.

Also, when related information of the electronic ticket has to be stored, it is supposed that a memory is required which has a capacity being larger than that required to simply store original information (data) of a ticket itself. However, since a required level of security for the related information is comparatively low, an ordinary memory rather than the so-called secure memory is preferably used as a storing device. Even in this case, however, it is needless to say that some limitation on access to the ordinary memory is necessary.

Examples of storing such electronic related information in the secure memory or in the ordinary memory to which no limitation on access to the ordinary memory is imposed are disclosed in Japanese Patent Application Laid-open Nos. 2003-162602, 2002-324256, 2002-189933, 2002-140742, and 2002-83333. However, in the case of these examples disclosed, there is a danger that such the related information is easily deleted or tampered with by a malicious person.

SUMMARY OF THE INVENTION

In view of the above, it is an object of the present invention to provide an electronic information authenticating system and portable information terminal being capable of providing enhanced security of specified electronic information and its related information stored in the portable information terminal with lower cost and an electronic information authenticating method to be used in the above electronic information authenticating system and the portable information terminal.

According to a first aspect of the present invention, there is provided an electronic information authenticating system for storing electronic information issued by an issuing server in a portable information terminal and authenticating, when service is provided, the electronic information stored in the portable information terminal by using an authenticating server, wherein the portable information terminal includes:

a first memory which retains an enhanced level of security and stores electronic information containing information required for authentication when the service is provided, and a second memory which retains a level of security being lower than that retained by the first memory and which stores related information of the electronic information, and wherein the electronic information and related information of the electronic information are separately authenticated.

In the foregoing, a preferable mode is one wherein the first memory includes, at least, an IC (Integrated Circuit) being excellent in tamper-resistance.

Also, a preferable mode is one that wherein includes, at least, a managing server to manage authentication to be performed on access from an issuing server to the second memory.

Also, a preferable mode is one wherein the portable information terminal has a unit to download an authenticating program that manages authentication to be performed on access to the second memory from the managing server.

Also, a preferable mode is one wherein the authenticating program contains control information about access to the second memory.

Also, a preferable mode is one wherein the portable information terminal has a unit to receive control information about access to the second memory from the managing server.

Furthermore, a preferable mode is one wherein the portable information terminal has a unit to access to a related information providing server which feeds related detailed information being more detailed than the related information based on information described in the related information.

According to a second aspect of the present invention, there is provided a portable information terminal for storing electronic information issued by an issuing server and authenticated by an authenticating server when service is provided, including:

a first memory which retains an enhanced level of security and stores electronic information containing information required for authentication when the service is provided; and a second memory which retains a level of security being lower than that retained by the first memory and which stores related information of the electronic information;

wherein the electronic information and related information of the electronic information are separately authenticated.

In the foregoing, a preferable mode is one wherein the first memory includes, at least, an IC being excellent in tamper-resistance.

Also, a preferable mode is one wherein, at least, authentication and management on access from an issuing server to the second memory is performed by a managing server.

Also, a preferable mode is one that wherein includes a unit to download an authenticating program that manages authentication to be performed on access to the second memory from the managing server.

Also, a preferable mode is one wherein the authenticating program contains control information about access to the second memory.

Also, a preferable mode is one that wherein includes a unit to receive control information about access to the second memory from the managing server.

Furthermore, a preferable mode is one that wherein includes a unit to access to a related information providing server which feeds related detailed information being more detailed than the related information based on information described in the related information.

According to a third aspect of the present invention, there is provided an electronic information authenticating method for storing electronic information issued by an issuing server in a portable information terminal and authenticating, when service is provided, the electronic information stored in the portable information terminal by using an authenticating server, the method including:

a step of storing electronic information containing information required for authentication when service is provided in a first memory retaining an enhanced level of security mounted in the portable information terminal;

a step of storing related information of the electronic information in a second memory which retains a level of security being lower than that retained by the first memory and which is mounted in the portable information terminal; and a step of separately authenticating the electronic information and related information of the electronic information.

In the foregoing, a preferable mode is one wherein the first memory includes, at least, an IC being excellent in tamper-resistance.

Also, a preferable mode is one wherein authentication and management of access from an issuing server to the second memory is performed by a managing server.

Also, a preferable mode is one wherein an authenticating program that manages authentication to be performed on access to the second memory is downloaded from the managing server to the portable information terminal.

Also, a preferable mode is one wherein the authenticating program contains control information about access to the second memory.

Also, a preferable mode is one wherein the portable information terminal receives control information about access to the second memory from the managing server.

Furthermore, a preferable mode is one wherein the portable information terminal accesses to a related information providing server which feeds related detailed information being more detailed than the related information based on information described in the related information.

With the above configuration, enhanced security of specified electronic information and its related information can be provided with lower cost.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
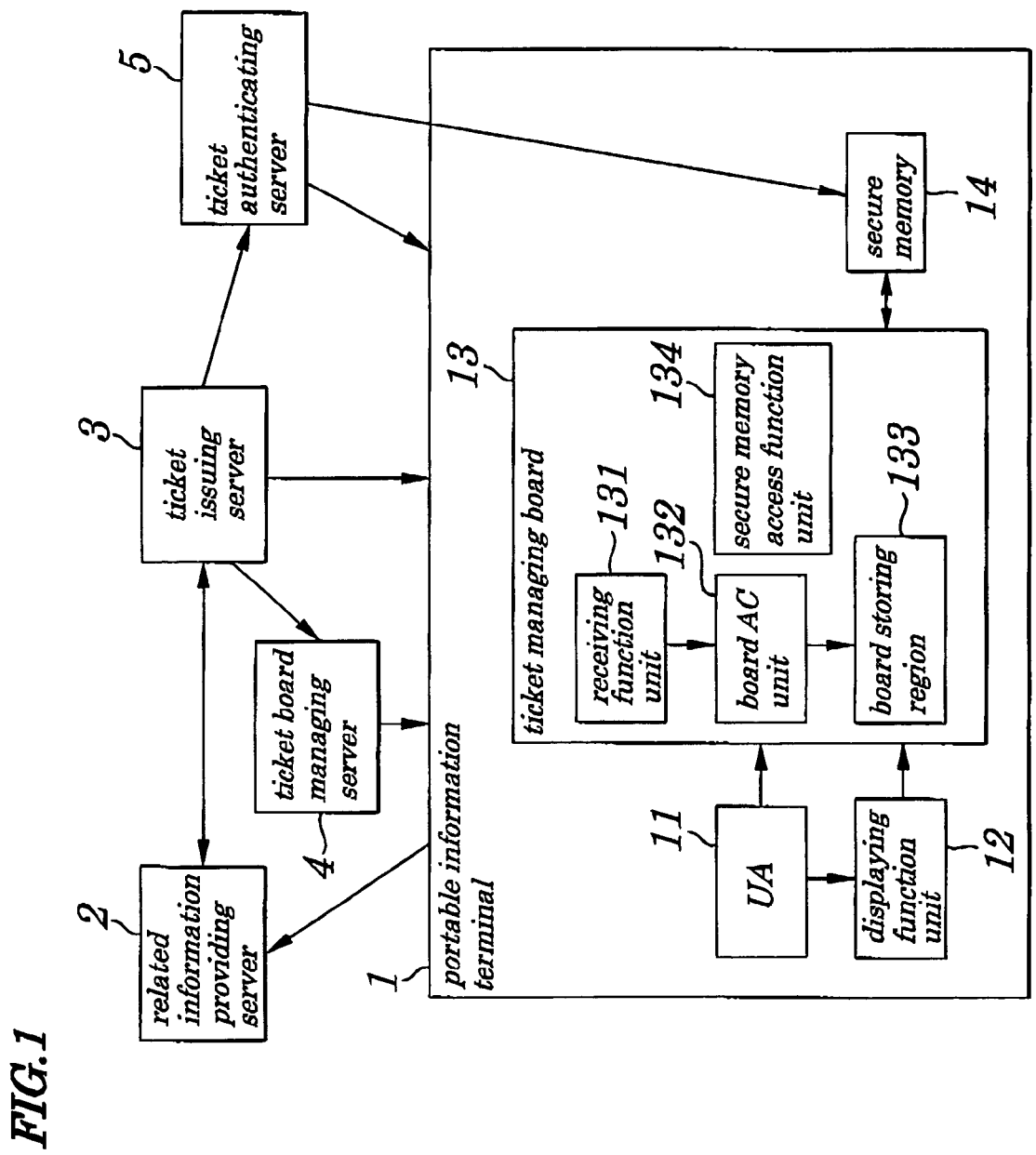
FIG. 1 is a block diagram showing configurations of an electronic information authenticating system according to a first embodiment of the present invention.

FIG. 1 is a block diagram showing configurations of an electronic information authenticating system of a first embodiment of the present invention. Authentication of information about an electronic ticket (which provides, in a form of electronic data, a concert ticket, movie ticket, airline ticket, lodging ticket, admission ticket of an amusement park and recreational facility, resident card ticket, and a like) managed by an electronic information authenticating system of the embodiment of the present invention is described by referring to FIG. 1. FIG. 1 shows an example of the electronic information authenticating system to be used after a user has acquired the electronic ticket.

As shown in FIG. 1, the electronic information authenticating system of the embodiment of the present invention includes, at least, a portable information terminal 1 such as a portable cellular phone, a PDA (Personal Digital Assistant) or a like, a related information providing server 2, a ticket issuing server 3, a ticket board managing server 4, and a ticket authenticating server 5.

The portable information terminal 1 is made up of, at least, a UA (User Agent) 11, a displaying function unit 12, a ticket managing board 13, and a secure memory 14 retaining enhanced security.

The UA 11 has a function of operating the ticket managing board 13 and of making a request for displaying related information according to an instruction of the user. The displaying function unit 12 has a function of displaying related information according to the UA 11 or the ticket managing board 13. At this point in time, the displaying function unit 12, when receiving an address of the related information providing server 2, accesses to the related information providing server 2 to acquire necessary information for displaying operations. It is needless to say that the displaying function unit 12 can display related information.

The ticket managing board 13 is made up of, at least, a receiving function unit 131, a board AC (Access Control) unit 132, a board storing region 133, a secure memory access function unit 134.

The receiving function unit 131 has a function of setting information about the electronic ticket and its related information which have been received from the ticket issuing server 3, a function of setting access control information, for accessing from the ticket issuing server 3 and the ticket authenticating server 5 to the board storing region 133, which has been received from the ticket board managing server 4, and a function of processing of ticket authentication according to an instruction from the ticket authenticating server 5.

The board AC unit 132 has a function of managing access control information of the ticket issuing server 3. The board AC unit 132 is informed of the access control information by the ticket board managing server 4. The board AC unit 132, when a request for access to the board storing region 133 is made by the ticket issuing server 3, exercises access control according to access control information.

The board storing region 133 has a function of storing related information passed from the ticket issuing server 3 to which an access is permitted by the board AC unit 132. Units accessible to the board storing region 133 include the UA 11, ticket board managing server 4, and ticket issuing server 3. The electronic ticket to which consideration on security needs to be given is stored in the secure memory 14, however, the electronic ticket to which consideration on security needs not to be given is put into the board storing region 133.

The secure memory access function unit 134 has a function of accessing to the secure memory 14. The secure memory 14 is a memory made up of an IC card being excellent in tamper-resistance. This memory may be embedded in the portable information terminal 1 or may be attachable/detachable to the portable information terminal 1.

The related information providing server 2 is a server which provides related information being more detailed than that associated with an electronic ticket given by the ticket issuing server 3.

When an address of the related information providing server 2 is described in related information, the portable information terminal 1 can access to the related information providing server 2 having the address to acquire more detailed related information.

The ticket issuing server 3 is a server that can provide both information about the electronic ticket to be stored in the secure memory 14 and related information to be stored in the board storing region 133 in the ticket managing board 13. The ticket board managing server 4 has functions of performing processes by which the ticket managing board 13 is enabled by the portable information terminal 1 and by which the ticket issuing server 3 is accessible to the ticket managing board 13.

The ticket authenticating server 5 has a function of confirming existence of the electronic ticket when the user receives a certain type of service by using the electronic ticket. Moreover, the related information providing server 2, ticket issuing server 3, and ticket authenticating server 5 may be realized on a same server.

Figure 2:
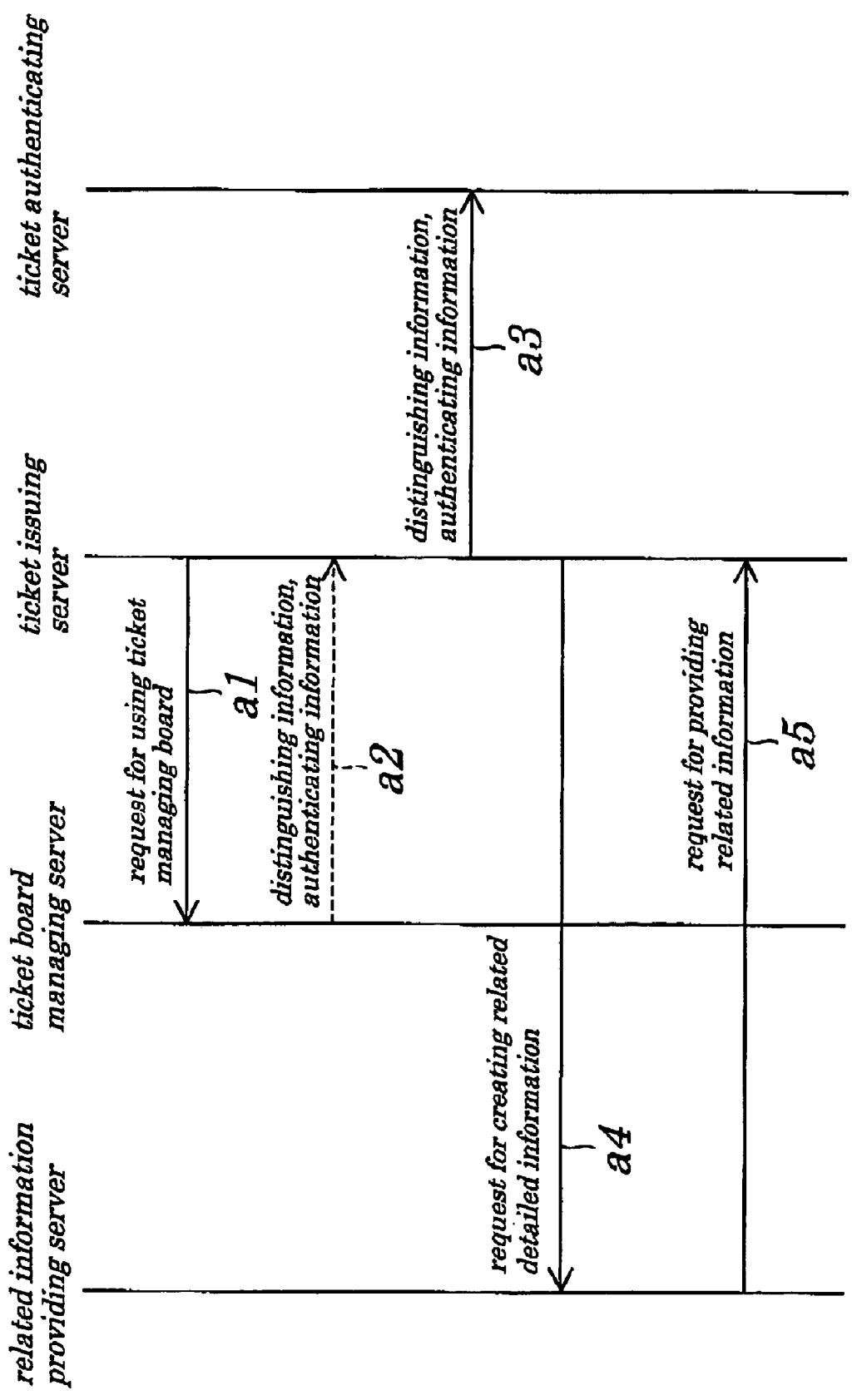
FIG. 2 is a sequence chart showing processing to be performed when a ticket issuing server of FIG. 1 provides service by using a ticket managing board in a portable information device according to the first embodiment of the present invention.
Figure 3:
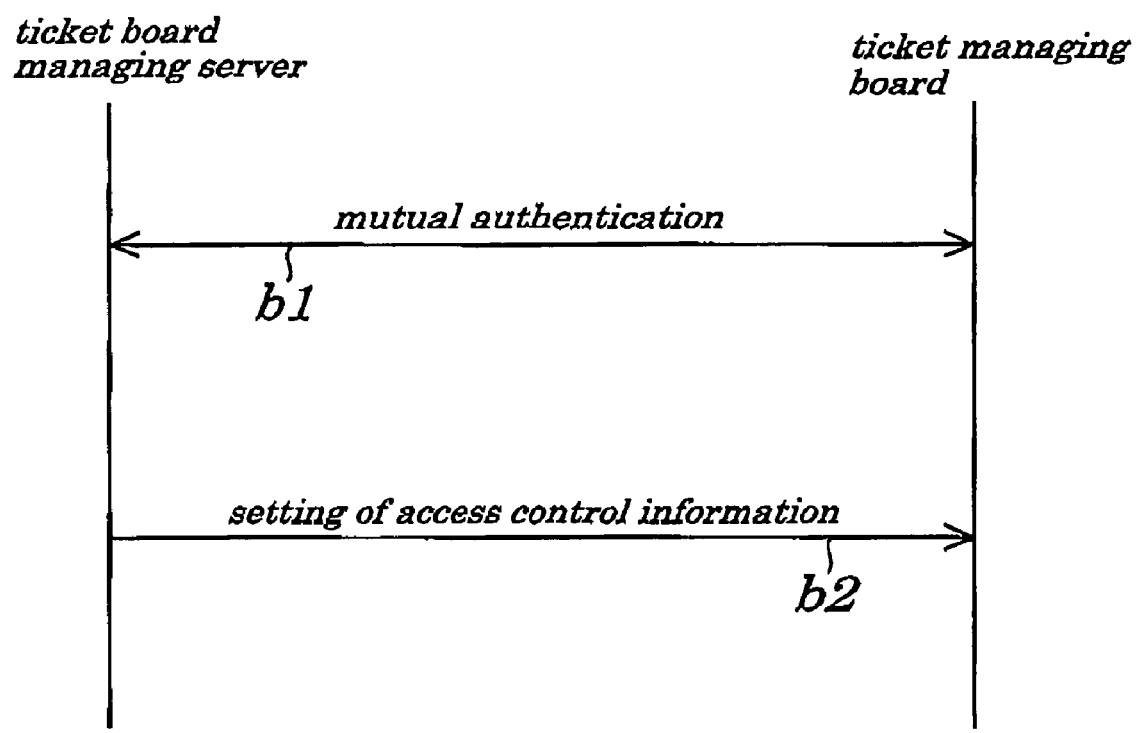
FIG. 3 is a sequence chart showing a procedure by which a ticket issuing server and a ticket authenticating server become accessible to the ticket managing board in the portable information terminal shown in FIG. 1 according to the first embodiment of the present invention.

FIG. 2 is a sequence chart showing processing to be performed when the ticket issuing server 3 of FIG. 1 provides service by using the ticket managing board 13 in the portable information terminal 1 of the first embodiment of the present invention. FIG. 3 is a sequence chart showing procedures of setting so that the ticket issuing server 3 and ticket authenticating server 5 are accessible to the ticket managing board 13 of the first embodiment of the present invention.

Figure 4:
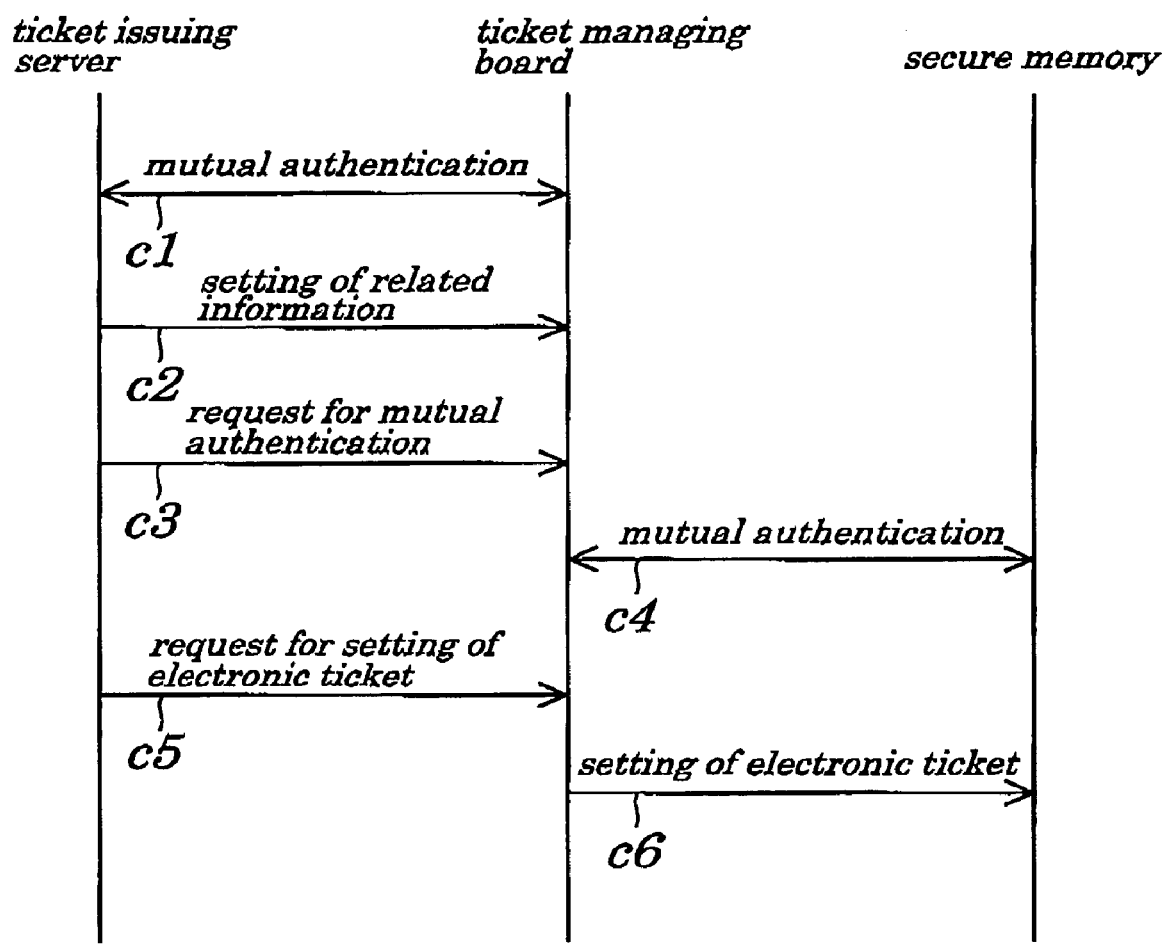
FIG. 4 is a sequence chart showing a procedure by which the ticket issuing server sets related information in the portable information terminal shown in FIG. 1 according to the first embodiment of the present invention.
Figure 5:
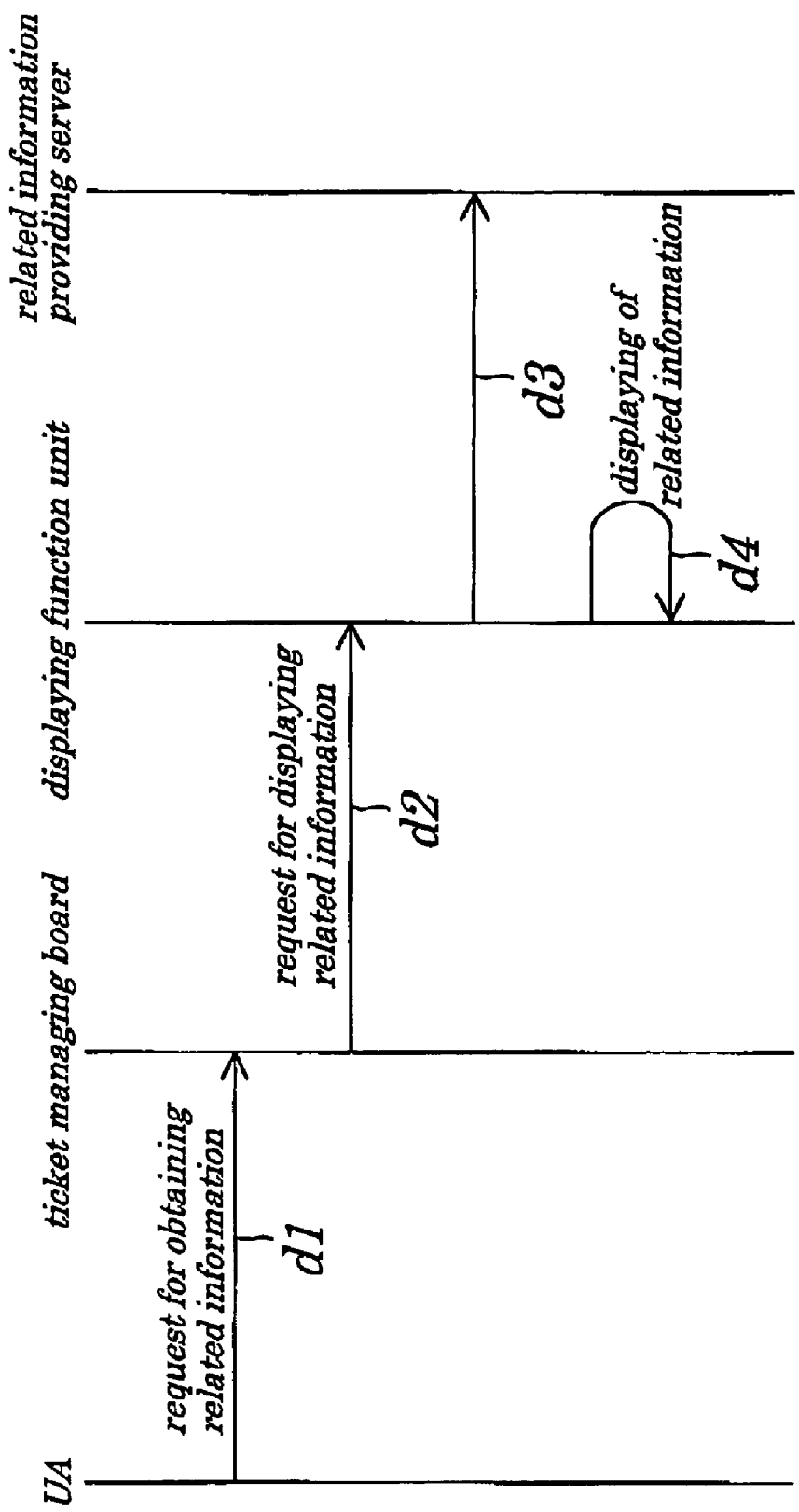
FIG. 5 is a sequence chart showing a procedure by which a user makes a reference to related information according to the first embodiment of the present invention.
Figure 6:
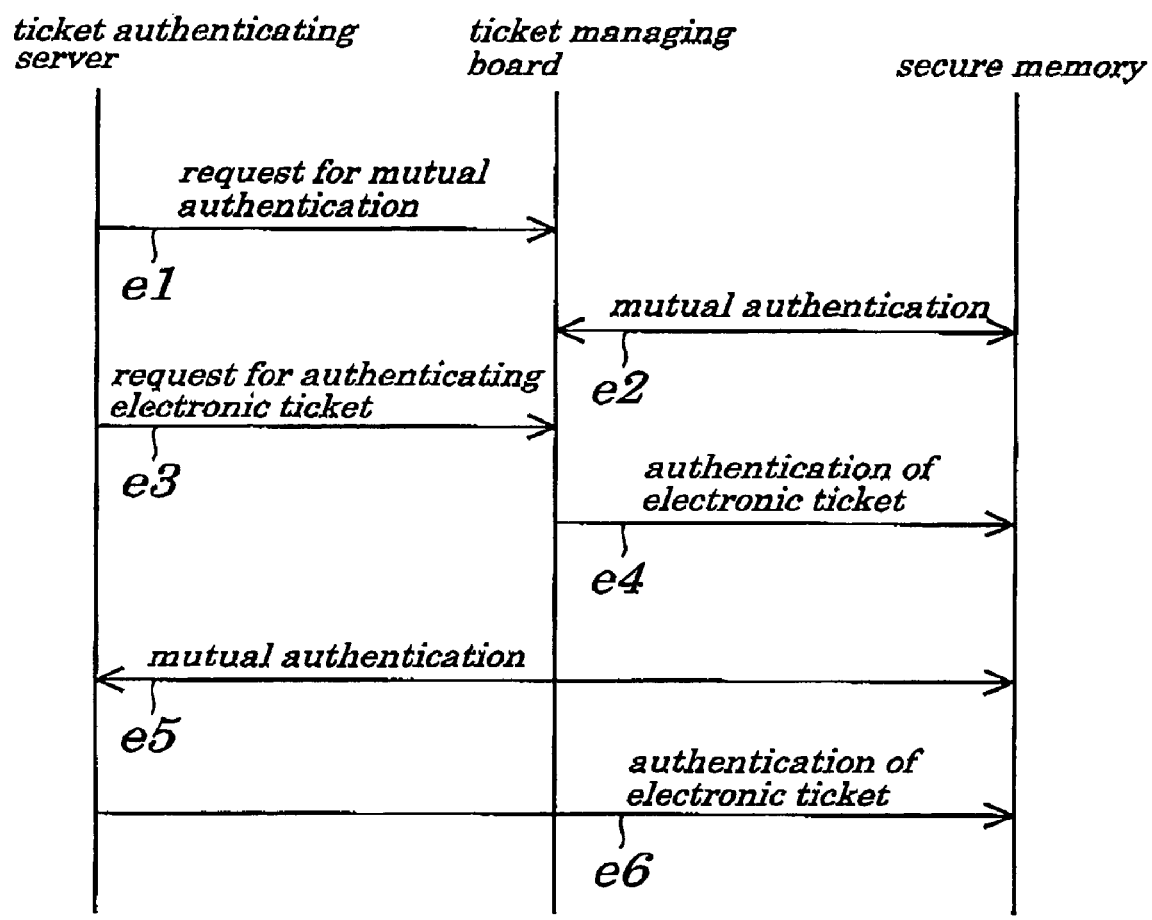
FIG. 6 is a sequence chart showing a procedure by which a user wants to use an electronic ticket that the user desires to obtain to receive corresponding service according to the first embodiment of the present invention.

FIG. 4 is a sequence chart showing a procedure by which the ticket issuing server 3 sets an electronic ticket and its related information in the portable information terminal 1 shown in FIG. 1 according to the first embodiment. FIG. 5 is a sequence chart showing a procedure by which a user makes a reference to related information according to the first embodiment. FIG. 6 is a sequence chart showing a procedure by which the user wants to use the electronic ticket that the user desires to obtain to receive corresponding service according to the first embodiment.

Operations of the electronic information authenticating system of the embodiment of the present invention will be described by referring to FIG. 1 to FIG. 6. The operations of the electronic information authenticating system of the embodiment of the present invention can be classified into five categories; (1) one being an operation of making a request for access to the ticket managing board 13, (2) another being an operation of setting so that the ticket issuing server 3 accesses to the ticket managing board 13, (3) another being an operation of acquiring information about the electronic ticket and related information, (4) another being an operation of using the related information, and (5) another being an operation of using the electronic ticket.

First, the "operation of making a request for access to the ticket managing board 13" is described. The ticket issuing server 3 informs the ticket board managing server 4 of a desire for using the ticket managing board 13 (see "a1" in FIG. 2). At this point in time, if necessary, mutual authentication between the ticket issuing server 3 and the ticket board managing server 4 is performed.

After that, the ticket issuing server 3 acquires distinguishing information that the ticket board managing server 4 can uniquely distinguish and information about authentication required for mutual authentication between the portable information terminal 1 and the ticket issuing server 3 (see "a2" in FIG. 2).

The distinguishing information and authenticating information acquired by the ticket issuing server 3 is passed to the ticket authenticating server 5 (see "a3" in FIG. 2). In the embodiment, the ticket authenticating server 5 receives the distinguishing information and authenticating information from the ticket issuing server 3, however, the ticket authenticating server 5 may receive the information directly from the ticket board managing server 4.

Also, the distinguishing information and authenticating information are used when notification of using the ticket managing board 13 is sent to the portable information terminal 1 and, at this point in time, the distinguishing information and authenticating information held by the ticket issuing server 3 are the same as or different from those held by the ticket authenticating server 5. In the latter case, the ticket board managing sever 4 has to input and set the distinguishing information and authenticating information to be used by the ticket issuing server 3 and those to be used by the ticket authenticating sever 5 separately on the board AC unit 132 in the portable information terminal 1.

When detailed information (hereinafter referred to as "related detailed information") being information related to the electronic ticket to be issued by the ticket issuing server 3 is to be fed to the user, the ticket issuing server 3 makes a request asking the related information providing server 2 to create related detained information (see "a4" in FIG. 2). The related detailed information is information being more detailed than the related information to be set in the board storing region 133 in the portable information terminal 1.

Also, when the related information providing server 2 has to feed detailed information related to the electronic ticket issued by the ticket issuing server 3 or another related information to the user, the related information providing server 2 informs the ticket issuing server 3 of a desire that related information including an address of the related information providing server 2 is to be provided (see "a5" in FIG. 2).

By completing all these processes, the ticket issuing server 3 is able to provide the electronic ticket to the user. Also, the ticket issuing server 3, whenever necessary, prepares related information.

The related information includes, at least, displayed information (that is, information to be displayed on the displaying function unit 12 in the portable information terminal 1), authenticating information (information that the electronic ticket has been surely stored in the secure memory 14), related detailed information (address of related information providing server 2), distinguishing information (information that can uniquely distinguish a server being accessible to the related information), and access control information (default Read right and default Write right on a server that is uniquely distinguished by distinguishing information).

Next, the operation of setting so that the ticket issuing server 3 accesses to the ticket managing board 13 is described. It is assumed here that the user of the portable information terminal 1 goes to a site where the ticket board managing server 4 is installed to carry out communication with the ticket board managing server 4 via an infrared wireless LAN (Local Area Network) or a wireless LAN, or by using the portable telephone network (not shown), if it is available, carries out communication with the ticket board managing server 4.

First, mutual authentication between the ticket board managing server 4 and the ticket managing board 13 in the portable information terminal 1 is performed and both of them are authenticated as being correct ("b1" in FIG. 3). After that, the ticket board managing server 4 makes a request asking the ticket managing board 13 in the portable information terminal 1 to do setting of access control information ("b2" in FIG. 3). Communication with the ticket board managing server 4 is carried out by the receiving function unit 131 and access control information is stored in the board AC unit 132.

The access control information includes, at least, distinguishing information (distinguishing information that can uniquely distinguish a server that accesses to the ticket managing board 13, for example, distinguishing information about the ticket issuing server 3 or information about the ticket authenticating server 5), authenticating information (information to be used for authentication with a server that is uniquely distinguished by distinguishing information), and access control information (default Read right and Write right on a server that is uniquely distinguished by distinguishing information).

When each of the ticket issuing server 3 and ticket authenticating server 5 has different distinguishing information and authenticating information, by the above processing (process of "b2" in FIG. 3), setting of access control information to the ticket issuing server 3 and the ticket authenticating server 5 is required.

Next, the operation of acquiring information about the electronic ticket and its related information will be described. In this case, the ticket issuing server 3 carries out communication with the receiving function unit 131 installed in the ticket managing board 13 in the portable information terminal 1.

Mutual authentication between the ticket issuing server 3 and the ticket managing board 13 is performed ("c1" in FIG. 4). In this state, the ticket issuing server 3 passes distinguishing information that can distinguish the ticket issuing server 3 to the ticket managing board 13. The ticket managing board 13 searches for access control information that matches distinguishing information of the ticket issuing server 3 from the board AC unit 132, and then mutual authentication between the ticket issuing server 3 and the ticket managing board 13 is performed by using authentication information of the access control information obtained by the search and authentication information held by the ticket issuing server 3.

Then, the ticket issuing server 3 makes a request asking the ticket managing board 13 to set related information ("c2" in FIG. 4). In the portable information terminal 1, the related information is stored through the board AC unit 132 in the board storing region 133.

At this point in time, the board AC unit 132 checks an access right of the ticket issuing server 2 according to the access control information contained in the access control information that has been searched for by the above process ("c1") and, after having confirmed that the ticket issuing server 2 is a server that has a Write right, accesses to the board storing region 133.

The ticket issuing server 3 makes a request asking the ticket managing board 13 to perform mutual authentication between the ticket issuing server 13 and the secure memory 14 (process "c3" in FIG. 4). To perform this authenticating processing, the ticket issuing server 3 has to hold, in advance, authenticating information related to the secure memory 14. In this authenticating processing, the ticket issuing server 3 passes, in advance, information required for authentication to the ticket managing board 13. For example, the ticket issuing server 3 passes challenge and response data or a like to the ticket managing board 13.

The mutual authentication between the ticket managing board 13 and the secure memory 14 via the secure memory access function unit 134 is performed ("c4" in FIG. 4). Then, the ticket issuing server 3 makes a request asking the ticket managing board 13 to do setting of the electronic ticket to the secure memory 14 ("c5" in FIG. 4). The ticket managing board 13 does setting of the electronic ticket to the secure memory 14 via the secure memory access function unit 134 ("c6" in FIG. 4).

Next, the operation of using the related information is described. When the user wants to make a reference to related information, the user operates a GUI (Graphical User Interface) screen or a like of the UA 11 in the portable information terminal 1 to inform the ticket managing board 13 that the user has received the related information about the electronic ticket ("d1" in FIG. 5).

In this case, the receiving function unit 131 in the ticket managing board 13 receives the request for obtaining the related information and the ticket managing board 13, via the board AC unit 132, searches for related information stored in the board storing region 133 designated by the user. An access control at this point in time is exercised according to an access control information of the related information. If access control information about the UA 11 has been not yet set, the access control information contained in the access control information set by the above process "b2" is applied.

The ticket managing board 13 passes displaying information contained in the related information to the displaying function unit 12 ("d2" in FIG. 5). The displaying function unit 12 displays the received displaying information (d4 in FIG. 5). In this state, the displaying function unit 12 displays displaying information or related detailed information on a display (not shown) of the portable information terminal 1.

If the displaying information is an address of the related information providing server 2, the displaying function unit 12 begins communication with the related information providing server 2 to obtain related detailed information ("d3" in FIG. 5) Then, the displaying function unit 12 displays the received displaying information ("d4" in FIG. 5). In this state, also, the displaying function unit 12 displays the displaying information or related detailed information on the display (not shown) of the portable information terminal 1.

Moreover, the operation of using the electronic ticket is described. When the user wants to receive corresponding service by using the electronic ticket, the ticket authenticating server 5 makes a request asking the ticket managing board 13 to perform mutual authentication between the ticket managing board 13 and the secure memory 14 ("e1" in FIG. 6). Mutual authentication between the ticket managing board 13 and the secure memory 14 is performed via the secure memory access function unit 134 ("e2" in FIG. 6). These processes are the same as that of mutual authentication between the ticket authenticating server 5 and the secure memory 14 mounted in the portable information terminal 1. These processes are also the same as those of the processes "c3" and "c4" described above.

Then, the ticket authenticating server 5 makes a request asking the ticket managing board 13 to confirm the electronic ticket set on the secure memory 14 ("e3" in FIG. 6). The ticket managing board 13 confirms the electronic ticket set in the secure memory 14 via the secure memory access function unit 134 ("e4" in FIG. 6). These processes are the same as those of the processes "c5" and "c6" described above.

When the secure memory 14 is mounted in a manner being separated from the portable information terminal 1, mutual authentication between the ticket authenticating server 5 and the secure memory 14 is performed ("e5" in FIG. 6) and an electronic ticket set in the secure memory 14 is authenticated ("e6" in FIG. 6).

Thus, according to the first embodiment of the present invention, since authentication is performed separately on the electronic ticket and related information, it is made possible for one ticket issuer to safely provide related information, or for another party being different from the ticket issuer to safely provide related information, or for an another related party, by referring to the related information, to safely store new related information.

That is, according to the first embodiment of the present invention, only a party (server) authenticated by the ticket board managing server 4 can access to the ticket managing board 13 and can protect the board storing region 133 and related information against a malicious party (server).

Also, according to the first embodiment of the present invention, even if a new ticket issuer appears, access control information about the new issuer can be easily incorporated in the ticket managing board 13 in the portable information terminal 1. This enables the portable information terminal 1 to carry out communication with the ticket board managing server 4 whenever the new ticket issuer is incorporated.

Whenever the user goes to a site or a store where the ticket board managing server 4 is installed, the user can carry out the communication. In this case, according to the embodiment, when the portable information terminal 1 can use a portable telephone network, the user can carry out communication with the ticket board managing server 4 existing remotely.

Also, according to the first embodiment of the present invention, related information about the electronic ticket can be stored in a memory being cheaper than the secure memory 14, which enables related information requiring a large-capacity memory to be managed. That is, only minimum information required to use the electronic ticket is stored in the secure memory 14 and other low-priced memory can be used for storing other information of less importance.

Also, according to the first embodiment of the present invention, since an address of the related information providing server 2 can be described in related information, access to the related information providing server 2 from the portable information terminal 1 is made possible and, therefore, more detailed related information can be provided to users.

Furthermore, since each piece of the related information contains information about each of various servers that permits access to the related information and access control information about applications, if each of the servers uses one of related information and/or one of the related information is used by an application installed in the portable information terminal 1, access control is made possible for each kind of server or for the application.

Second Embodiment

Figure 7:
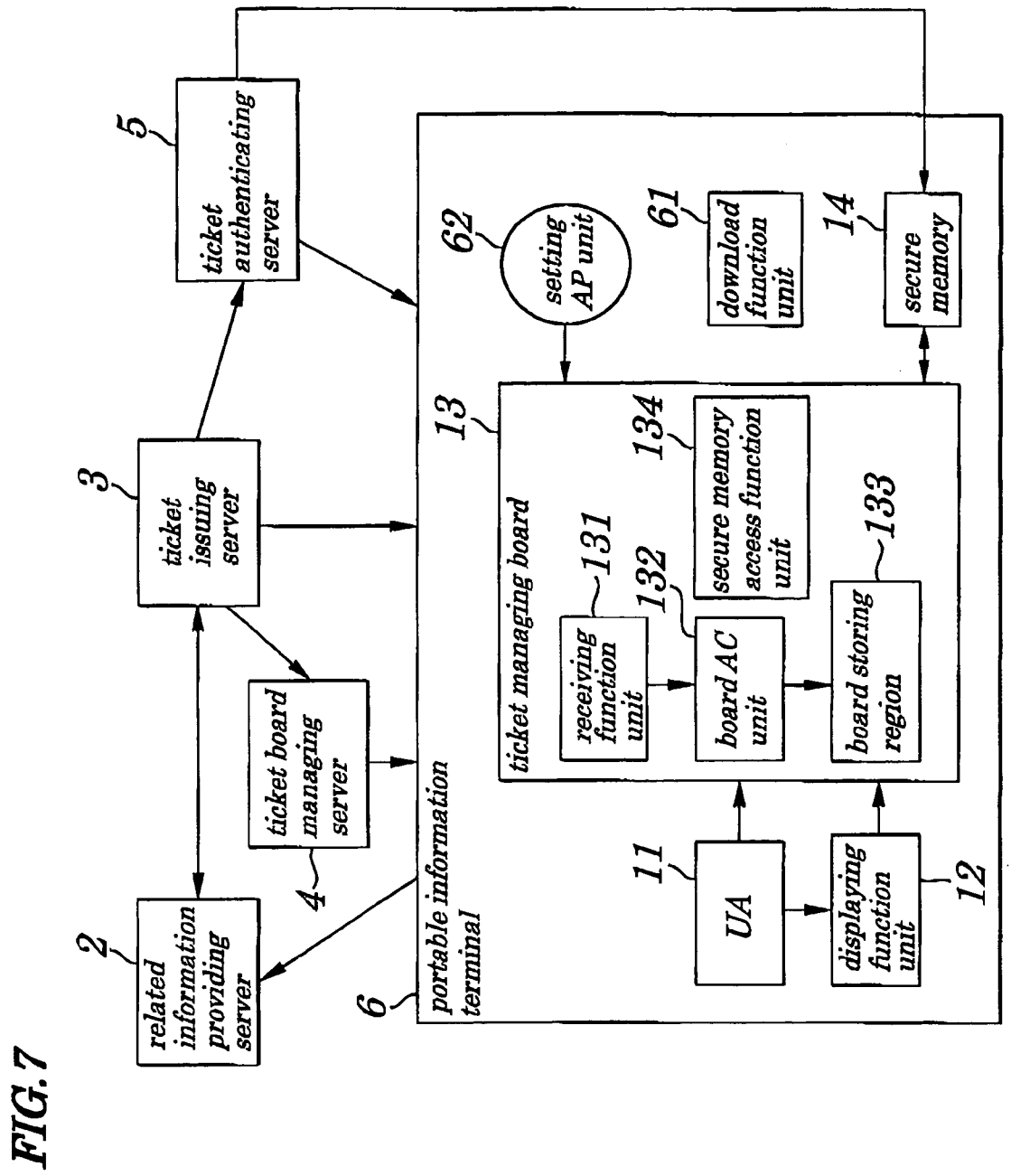
FIG. 7 is a block diagram showing configurations of an electronic information authenticating system according to a second embodiment of the present invention.

FIG. 7 is a schematic block diagram showing configurations of an electronic information authenticating system according to a second embodiment of the present invention. Configurations of the electronic information authenticating system of the second embodiment shown in FIG. 7 are the same as those in the first embodiment of the present invention except that a download function unit 61 and a setting AP (Application Program) unit 62 to store an application program are added. In FIG. 7, same reference numbers are assigned to parts corresponding to those in FIG. 1 except a portable information terminal. Operations of the same components in the second embodiment are the same as those in the first embodiment.

The download function unit 61 has a function of downloading an application program stored in the setting AP unit 62 from a ticket board managing server 4. As a result, the ticket board managing server 4 has a function of managing the setting AP unit 62 and of transmitting the application program in the setting AP unit 62 in cooperation with the download function unit 61.

The setting AP unit 62 has a function of setting access control information, which had been done by the ticket board managing server 4 as in the first embodiment described above, instead of the ticket board managing server 4. A procedure by which access control information is set differs from that employed in the first embodiment of the present invention.

Figure 8:
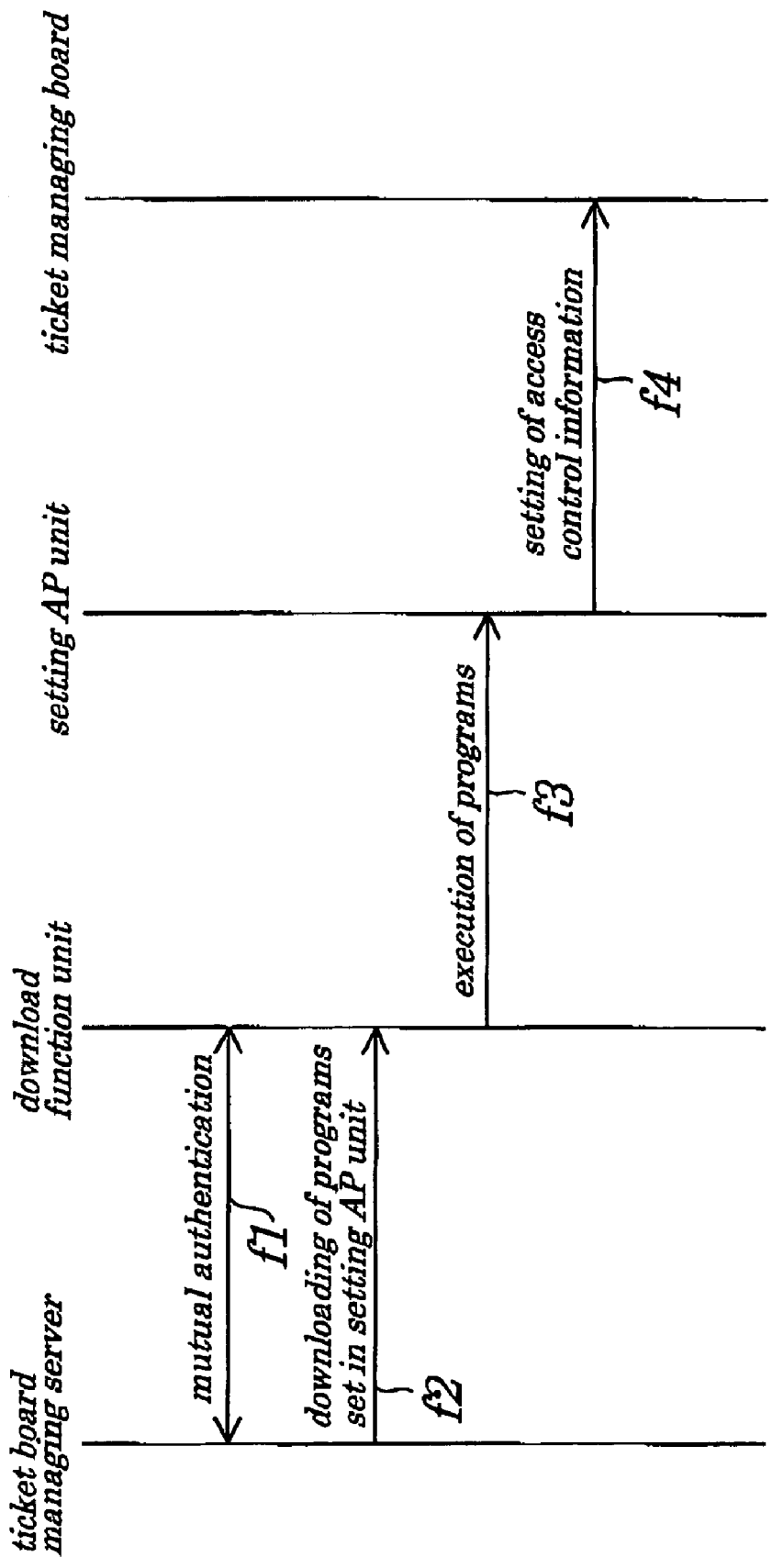
FIG. 8 is a sequence chart showing a procedure by which access control information is set according to the second embodiment of the present invention.

FIG. 8 is a sequence chart showing a procedure by which access control information is set according to the second embodiment of the present invention. The procedure by which access control information is set is described by referring to FIG. 7 and FIG. 8.

Mutual authentication between the ticket board managing server 4 and the download function unit 61 in a portable information terminal 6 is performed ("f1" in FIG. 8). The download function unit 61 downloads application programs stored in the setting AP unit 62 containing access control information from the ticket board managing server 4 ("f2" in FIG. 8). The download function unit 61 executes application programs in the setting AP unit 62 downloaded from the ticket board managing server 4 ("f3" in FIG. 8). If the download function unit 61 does not execute the application programs, a user can make a request asking the portable information terminal 6 to execute the application programs stored in the setting AP unit 62.

The setting AP unit 62 passes access control information contained in the application programs stored in the setting AP unit 62 to the ticket managing board 13. The ticket managing board 13 sets the access control information to a board AC unit 132 via a receiving function unit 131 ("f4" in FIG. 8). The ticket managing board 13 may access to the board AC unit 132 to set the access control information.

At this point in time, mutual authentication between the setting AP unit 62 and the ticket managing board 13 is not required since the program has been downloaded by the setting AP unit 62 from the reliable ticket board managing server 4, the program in the setting AP unit 46 can be reliable.

Thus, according to the second embodiment, since the user downloads an application program stored in the setting AP unit 62, after having set access control information, electronic ticket, its related information to the portable information terminal 6 or after having allowed a memory in the portable information terminal 6 to be used for the information, when compared with the above case in the first embodiment, approval/agreement for the user can be made clearer to the user.

Third Embodiment

Figure 9:
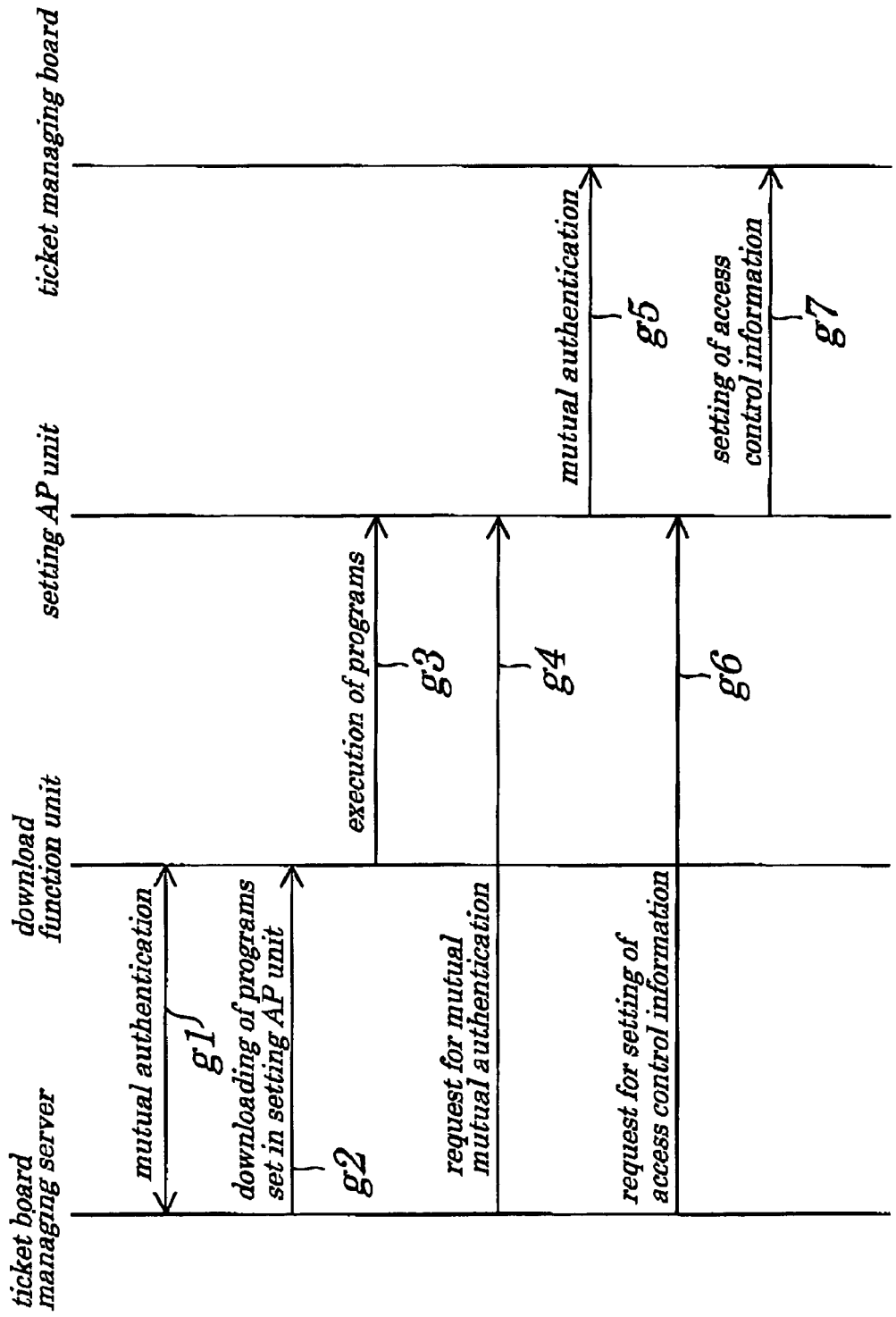
FIG. 9 is a sequence chart showing a procedure by which access control information is set according to a third embodiment of the present invention.

FIG. 9 is a sequence chart showing a procedure by which access control information is set according to a third embodiment of the present invention. Configurations of the electronic information authenticating system of the third embodiment are the same as those in the second embodiment. Processes of "g1" to "g3" in FIG. 9 are the same as the "f1" to "f3" employed in the second embodiment and their descriptions are omitted accordingly.

A ticket managing server 4 has a function of communicating with a setting AP unit 62 from which an application program has been downloaded in a portable information terminal 6. An application program stored in the setting AP unit 62 downloaded in the portable information terminal 6 can be put into a state of being communicable with the ticket managing server 4.

In the second embodiment, if necessary, mutual authentication between the ticket board managing server 4 and the ticket managing board 13 via the setting AP unit 62 is performed ("g4" and "g5" in FIG. 9). Then, the ticket board managing server 4 begins to carry out communication with the setting AP unit 62 and transmits access control information to the setting AP unit 62 to make a request asking the setting AP unit 62 to set the access control information ("g6" in FIG. 9).

The setting AP unit 62 passes access control information received from the ticket board managing server 4 to the ticket managing board 13. The ticket managing board 13 sets the access control information to the board AC unit 132 via a receiving function unit 131 (g7 in FIG. 9).

In the second embodiment, since access control information is embedded in the application programs in the setting AC unit 62, if there are various pieces of access control information being different from one another, the number of the programs in the setting AC unit 62 corresponding to the number of the various pieces of the access control information has to be prepared.

Unlike in the second embodiment, in the third embodiment, since access control information is obtained from the ticket board managing server 4 with communication, it is not necessary to prepare two or more programs in the setting AP unit 62. According to the third embodiment, the number of programs in the setting AP unit 62 can be only one and, therefore, flexible setting of the access control information is made possible.

Thus, as described above, according to the electronic information authenticating system of the present invention, when specified electronic information about an electronic ticket, information of an electronic ticket itself including information required for authentication for admission to a specified place or a like is stored in a memory retaining an enhanced level of security such as an IC card which is expensive but excellent in tamper-resistance and related information of the electronic ticket is stored in the board storing region in the ticket managing board in a portable information terminal.

Also, in the electronic information authenticating system of the present invention, by storing related information in the board storing region, unless an access right is obtained from a supplier of the ticket managing board, the storing is not permitted and neither its authentication nor reference are allowed.

As a result, the user of the electronic ticket requires two times' authentication including one to be performed in the secure memory to store information about the electronic ticket itself and the other to be performed in the board storing region in the ticket managing board to store related information of the electronic ticket.

Therefore, in the electronic information authenticating system of the present invention, enhanced security of specified electronic information and its related information can be provided in the portable information terminal, without causing high costs.

It is apparent that the present invention is not limited to the above embodiments but may be changed and modified without departing from the scope and spirit of the invention.

Moreover, the present invention may be used not only for authentication of the electronic ticket but also for authentication of a resident card, information about amounts of a pre-paid card, entrance ticket such as an invitation card, other various electronic information that can be used in a form of electronic data.

What is claimed is:

1. An electronic information authenticating system comprising a portable information terminal, an issuing server and authenticating server, the system for storing in the portable information terminal electronic information required for authentication for provision of a service issued by the issuing server and authenticating, when the service is provided, said electronic information stored in said portable information terminal by using the authenticating server, wherein said portable information terminal comprises:

a first memory operable to maintain an enhanced level of security and to store the electronic information and a second memory operable to maintain a level of security being lower than that maintained by said first memory and to store second information related to said electronic information, and wherein said electronic information and said second information are separately authenticated before the service is provided.

2. The electronic information authenticating system according to claim 1, wherein said first memory comprises a tamper-resistant integrated circuit.

3. The electronic information authenticating system according to claim 1, further comprising a managing server to manage authentication performed on access from the issuing server to said second memory.

4. The electronic information authenticating system according to claim 3, wherein said portable information terminal has a unit to download an authenticating program that manages the authentication performed on the access to said second memory from said managing server.

5. The electronic information authenticating system according to claim 4, wherein said authenticating program contains control information about the access to said second memory.

6. The electronic information authenticating system according to claim 4, wherein said portable information terminal comprises a unit to receive control information about the access to said second memory from said managing server.

7. The electronic information authenticating system according to claim 1, wherein said portable information terminal comprises a unit to access a second information providing server operable to feed related detailed information more detailed than said second information based on information described in said second information.

8. A portable information terminal for storing electronic information required for authentication for provision of a service issued by an issuing server and authenticated by an authenticating server when the service is provided, the portable information terminal comprising:

a first memory operable to maintain an enhanced level of security and to store electronic information when said service is provided; and a second memory operable to maintain a level of security lower than that maintained by said first memory and to store second information related to said electronic information;

wherein said electronic information and said second information are separately authenticated before the service is provided.

9. The portable information terminal according to claim 8, wherein said first memory includes a tamper-resistant integrated circuit.

10. The portable information terminal according to claim 8, wherein the authentication and management on access from an issuing server to said second memory is performed by a managing server.

11. The portable information terminal according to claim 10, further comprising a unit to download an authenticating program that manages authentication to be performed on access to said second memory from said managing server.

12. The portable information terminal according to claim 11, wherein said authenticating program contains control information about the access to said second memory.

13. The portable information terminal according to claim 11, further comprising a unit operable to receive control information about the access to said second memory from said managing server.

14. The portable information terminal according to claim 8, further comprising a unit to access a second information providing server operable to feed related detailed information being more detailed than said related second information based on information described in said second information.

15. An electronic information authenticating method for storing in a portable information terminal electronic information required for authentication for provision of a service issued by an issuing server and authenticating, when the service is provided, said electronic information stored in said portable information terminal by using an authenticating server, said method comprising:

storing the electronic information when said service is provided in a first memory operable to maintain an enhanced level of security mounted in said portable information terminal;

storing second information related to said electronic information in a second memory operable to maintain a level of security lower than that maintained by said first memory, the second memory being mounted in said portable information terminal; and separately authenticating said electronic information and second information before the service is provided.

16. The electronic information authenticating method according to claim 15, wherein said first memory includes a tamper-resistant integrated circuit.

17. The electronic information authenticating method according to claim 15, wherein the authentication and management of access from the issuing server to said second memory is performed by a managing server.

18. The electronic information authenticating method according to claim 17, wherein an authenticating program that manages authentication to be performed on access to said second memory is downloaded from said managing server to said portable information terminal.

19. The electronic information authenticating method according to claim 18, wherein said authenticating program contains control information about access to said second memory.

20. The electronic information authenticating method according to claim 18, wherein said portable information terminal receives control information about access to said second memory from said managing server.

21. The electronic information authenticating method according to claim 15, wherein said portable information terminal accesses a second information providing server operable to feed related detailed information more detailed than said second information based on information described in said second information.

22. An electronic information authenticating system comprising a portable information terminal, an issuing server and authenticating server, the system for storing in the portable information terminal electronic ticket required for authentication for provision of a service issued by the issuing server and authenticating, when the service is provided, said electronic ticket stored in said portable information terminal by using the authenticating server, wherein said portable information terminal comprises:

a first memory operable to maintain an enhanced level of security and to store the electronic ticket and a second memory operable to maintain a level of security being lower than that maintained by said first memory and to store second information related to said electronic ticket, and wherein said electronic information and said second information are separately authenticated before the service is provided.

23. The electronic ticket authenticating system according to claim 22, wherein said first memory comprises a tamper-resistant integrated circuit.

24. The electronic ticket authenticating system according to claim 22, further comprising a managing server operable to manage the authentication performed on access from the ticket issuing server to said second memory.

25. The electronic ticket authenticating system according to claim 24, wherein said portable information terminal comprises a unit operable to download an authenticating program that manages the authentication performed on the access to said second memory from said managing server.

26. The electronic ticket authenticating system according to claim 25, wherein said authenticating program contains control information about the access to said second memory.

27. The electronic ticket authenticating system according to claim 25, wherein said portable information terminal comprises a unit operable to receive control information about the access to said second memory from said managing server.

28. The electronic ticket authenticating system according to claim 22, wherein said portable information terminal comprises a unit to access a second information providing server operable to feed related detailed information more detailed than said second information based on information described in said second information.

29. A portable information terminal for storing an electronic ticket required for authentication for provision of a service issued by a ticket issuing server and authenticated by a ticket authenticating server when the service is provided, comprising:
  a first memory operable to maintain an enhanced level of security and to store the electronic ticket; and
  a second memory operable to maintain a level of security lower than that maintained by said first memory and to store second information related to said electronic ticket,
  wherein said electronic ticket and said second information are separately authenticated before the service is provided.

30. The portable information terminal according to claim 29, wherein said first memory includes a tamper-resistant integrated circuit.

31. The portable information terminal according to claim 29, wherein the authentication and management on access from the ticket issuing server to said second memory is performed by a managing server.

32. The portable information terminal according to claim 31, further comprising a unit to download an authenticating program that manages authentication performed on the access to said second memory from said managing server.

33. The portable information terminal according to claim 32, wherein said authenticating program contains control information about the access to said second memory.

34. The portable information terminal according to claim 32, further comprising a unit to receive control information about the access to said second memory from said managing server.

35. The portable information terminal according to claim 29, further comprising a unit to access a second information providing server operable to feed related detailed information more detailed than said second information based on information described in said second information.

36. An electronic ticket authenticating method for storing an electronic ticket required for authentication for provision of a service issued by a ticket issuing server and authenticating, when the service is provided, said electronic ticket stored in said portable information terminal by using a ticket authenticating server, said method comprising:
  storing the electronic ticket in a first memory operable to maintain an enhanced level of security mounted in said portable information terminal;
  storing second information related to said electronic ticket in a second memory operable to maintain a level of security lower than that maintained by said first memory and which is mounted in said portable information terminal; and
  separately authenticating said electronic ticket and second information of before the service is provided.

37. The electronic ticket authenticating method according to claim 36, wherein said first memory includes a tamper-resistant integrated circuit.

38. The electronic ticket authenticating method according to claim 36, wherein the authentication and management of access from the ticket issuing server to said second memory is performed by a managing server.

39. The electronic ticket authenticating method according to claim 37, wherein an authenticating program that manages authentication to be performed on the access to said second memory is downloaded from said managing server to said portable information terminal.

40. The electronic ticket authenticating method according to claim 39, wherein said authenticating program contains control information about the access to said second memory.

41. The electronic ticket authenticating method according to claim 39, wherein said portable information terminal receives control information about the access to said second memory from said managing server.

42. The electronic ticket authenticating method according to claim 36, wherein said portable information terminal accesses a second information providing server operable to feed related detailed information more detailed than said second information based on information described in said second information.

* * * * *